United States Patent [19]

Kracklauer

[11] 4,076,657
[45] Feb. 28, 1978

[54] POLYURETHANE SMOKE SUPPRESSION ADDITIVE

[75] Inventor: John J. Kracklauer, Boulder, Colo.

[73] Assignee: Syntex (U.S.A.) Inc., Palo Alto, Calif.

[21] Appl. No.: 666,529

[22] Filed: Mar. 12, 1976

Related U.S. Application Data

[63] Continuation of Ser. No. 485,855, Jul. 5, 1974, abandoned, which is a continuation-in-part of Ser. No. 227,254, Feb. 17, 1972, abandoned.

[51] Int. Cl.² .......................... C08G 18/14; C08K 5/56
[52] U.S. Cl. .......................... 260/2.5 AJ; 260/45.75 R
[58] Field of Search .................. 260/2.5 AJ, 45.75 R, 260/77.5 AB

[56] References Cited

U.S. PATENT DOCUMENTS

3,450,648 6/1969 Windemuth .................. 260/2.5 AC

FOREIGN PATENT DOCUMENTS

| 795,480 | 8/1973 | Belgium. |
| 4,874,541 | 10/1973 | Japan .............................. 260/2.5 AJ |
| 1,406,581 | 9/1975 | United Kingdom .......... 260/2.5 AJ |
| 1,200,739 | 7/1970 | United Kingdom ............. 260/45.75 |

*Primary Examiner*—C. Warren Ivy
*Attorney, Agent, or Firm*—Tom M. Moran; Joseph I. Hirsch

[57] ABSTRACT

Polyurethane plastics having improved smoke supression properties due to the incorporation therein of small amount of dicyclopentadienyl iron, or derivatives thereof, in chemically uncombined form. The improved polyurethane plastics are prepared by simple physical admixture of the dicyclopentadienyl iron, or derivatives thereof, in the plastic.

7 Claims, No Drawings

POLYURETHANE SMOKE SUPPRESSION ADDITIVE

CROSS REFERENCE TO RELATED APPLICATION

This application is a continuation of application Ser. No. 485,855, filed July 5, 1974, and now abandoned, which in turn is a continuation-in-part of application Ser. No. 227,254, filed Feb. 17, 1972, and now abandoned.

BACKGROUND OF THE INVENTION

1. The Invention

This invention relates to polymer formulation additives which impart a surprising reduction in smoke production to the plastic product upon combustion. In a further aspect, the invention relates to the use of dicyclopentadienyl iron and derivatives thereof, as smoke suppression additives in plastics. In a still further aspect, this invention relates to polyurethane plastics containing small amounts of dicyclopentadienyl iron, or derivatives thereof, in physical admixture, having improved smoke suppression properties.

2. The Prior Art

Dicyclopentadienyl iron (ferrocene) has been used as a smoke reducing additive for hydrocarbon fuels - see U.S. Pat. Nos. 3,294,685 and 3,341,311. This body of art is directed to the use of ferrocene and derivatives thereof, as a combustion catalyst to increase the quality of fuel combustion and, therefore, is directed to the increase of the overall flammability of the fuel.

Dicyclopentadienyl iron has also been employed as a flame retardant additive in polymers but in conjunction with chlorine and/or bromine containing compounds and, often, phosphorus and antimony containing compounds - see Belgium Pat. No. 621,125, British Pat. No. 1,049,333 and U.S. Pat No. 3,269,963. Although smoke reduction in polymers has been disclosed with other, unrelated additives - see British Pat. No. 1,080,468 - it is generally well-known that the use of flame retardant additives, e.g. ferrocene, in polymers, often leads to increased smoke production - see papers by Einhorn and Gaskill in the University of Utah Polymer Conference (June 15-16, 1970), pages 29, 52.

The use of ferrocene as a plastics additive has been broadly suggested by the art for a number of purposes other than smoke suppression, for example, U.V. light stabilizing in polyvinyl chloride - see *J. Appl. Poly. Sci.* 12(7), 1543 (1968); as an additive for improving corona resistance in plastics used as electrical insulating material, see British Pat. No. 1,200,739.

Now it has been discovered that polymer materials, especially polyurethane foams, having reduced smoke generating properties, can be obtained by the simple physical addition of certain effective amounts of dicyclopentadienyl iron or derivatives thereof.

SUMMARY

In summary, the present invention provides polyurethane plastics, containing from 0.1 to 1% dicyclopentadienyl iron, or derivatives thereof, chemically uncombined with the plastic, having improved smoke suppression properties. The invention will be further described herein below.

FURTHER DESCRIPTION OF THE INVENTION AND PREFERRED EMBODIMENTS

The polyurethane plastics, of the invention, contain dicyclopentadienyl iron, or derivatives thereof, in chemically uncombined mixture therewith, in an amount sufficient to effectively reduce the quantity of smoke generated by the polyurethane upon combustion.

I have found that the desired improvement in smoke suppression is typically obtained by using quantities of dicyclopentadienyl iron, or derivatives thereof, in the range of about from 0.1 to 1%, by wt., based on the polyurethane polymer and that typically best results are obtained by using about from 0.2 to .8%, by wt., of the additive, based on the weight of the polyurethane polymer. The amount of additive used is critical since quantities of the additives below 0.1% wt. are generally ineffective to produce any reduction in smoke generation and quantities of the additive above the prescribed range can have an adverse effect on flammability by functioning as a combustion catalyst for the plastic.

Suitable dicyclopentadienyl iron compounds which can be used include, for example, dicyclopentadienyl iron; monolower alkyl dicyclopentadienyl iron compounds, for example, ethyldicyclopentadienyl iron; t-butyldicyclopentadienyl iron, n-octyldicyclopentadienyl iron, and the like, di-(lower alkyl)cyclopentadienyl iron compounds, for example, di-(ethylcyclopentadienyl) iron, di-(isopropyl-cyclopentadienyl) iron, and the like, mono- and di-(lower alkanoyl)dicyclopentadienyl iron compounds, for example, acetyldicyclopentadienyl iron, butyryldicyclopentadienyl iron, diacetyldicyclopentadienyl iron, dibutyryldicyclopentadienyl iron, and the like, mono- and di-lower alkyl amino, lower alkyl, substituted dicyclopentadienyl iron compound such as, for example, N,N-dimethylaminomethyl cyclopentadienyl iron, and dimer and polymer reaction products of dicyclopentadienyl iron and lower alkyl substituted derivatives thereof with aldehydes or ketones, for example, 2,2-di(ethyldicyclopentadienyl iron)-propane, di-(butyldicyclopentadienyl iron)-methane, di(dicyclopentadienyl iron)-methane - note U.S. Pat. No. 3,437,634. As used herein above, the term lower alkyl and lower alkanoyl, respectively, refers to alkyl groups and alkanoyl groups having from one through eight carbon atoms and includes both straight chain and branched groups. Also in place of a single dicyclopentadienyl iron compound, mixtures of different dicyclopentadienyl compounds could, of course, also be used. I have further found that because of their lower volatility that the higher molecular weight dicyclopentadienyl iron derivaties yield products having improved storage properties because of the greater physical stability of the additive within the plastic. Suitable higher molecular weight dicyclopentadienyl iron derivatives include both simple high molecular weight ferrocene derivatives such as, for example, monoalkyl and dialkyl substituted ferrocenes, for example, butyldecyl ferrocene, hexadecyl ferrocene, bis-(heptylcyclopentadienyl)-iron, monoalkanoyl and dialkanoyl substituted ferrocenes, for example, lauroyl ferrocene, and also dimers and polymers such as, for example, vinyl ferrocene copolymers with vinyl chloride or acrylic acid methyl methacrylate, or butadiene (see U.S. Pat. No. 3,770,787) or cyclopentane (see U.S. Pat. No. 3,350,369); ferrocene condensation dimers and polymers with aldehydes and ketones, for example, 2,2-poly-(dicyclopentadienyl iron)-propane, see U.S. Application Serial No. 467,533, filed May 6, 1974; ferrocene addition products with polyvinyl chloride and polyvinylidene chloride; and the like. The high molecular weight ferrocene derivatives are known compounds and can be prepared according to known procedures such as, for example, described in J.A.C.S., 74, 3458 (1952), U.S. Pat. Nos. 3,238,185, 3,341,495, 3,350,369, 3,437,634, 3,673,232, 3,770,787 or by obvious modifications of such procedures.

It should also be noted that unlike the combustion products of a number of organo iron compounds such as, for example, iron carbonyl, the combustion products of dicyclopentadienyl iron, and its derivatives, are non-toxic.

The basic polyurethane plastics (or foams) used in the compositions of my invention are known materials and can be prepared according to known procedures. The invention is applicable to both rigid and flexible polyurethane plastics and especially applicable to polyurethane polymers formulated to produce durable low density foam. Also a greater degree of cross linking in the polyurethane system increases the smoke reduction response of the additive. This is particularly pertinent in the case of high resiliency or cold cure urethane foam systems which are also flame retardant due to their high degree of cross linking and which normally generate an undesirable amount of smoke upon combustion. Additional information concerning polyurethane plastics can be found from the literature such as, for example, *Polyurethane, Chemistry and Technology*, Volume I, J. H. Saunders and K. C. Frisch, Interscience, John Wiley & Sons, Inc., New York, New York (1963).

The polymer product herein can be optionally modified with components which improve various physical characteristics such as flow additives, fillers, release agents, pigments, stabilizers, antioxidants, and so forth, or other ingredients, such as barium sulfate, aluminum chloride, metal stearates, organo phosphates, organo phosphonates, organo halogen phosphate, organo halogen additives and the like.

The low smoke generating polyurethane plastics, of the invention, can be prepared by adding the dicyclopentadienyl compound to the raw materials prior to polymerization, conveniently the polyol component. Preferably the additive is then dispersed within the composition by high shear mixing or other conventional mixing techniques. As the dicyclopentadienyl iron compound does not affect the polymerization process, the polyurethane raw materials can then be condensed, and otherwise treated, according to conventional procedures.

The polymer products of the present invention are useful for the same applications as the parent polymers are known to be used, i.e. in automobile and airplane parts, containers, appliances, electrical devices, furniture, bedding, and so forth; and, by virtue of the present invention, are particularly useful in those applications wherein toxicity and/or smoke production upon (accidental) combustion is particularly to be avoided, such as in building or transportation vehicle parts, furniture and bedding materials.

DEFINITIONS

As used herein above and below, the following terms have the following meaning unless expressly stated to the contrary. The term plastic, is as defined in the Condensed Chemical Dictionary, Seventh Edition, by Reinhold Publishing Corporations at pages 751 and 2, and refers to a material that contains as an essential ingredient an organic substance of large molecular weight, is solid in its finished state, and, at some stage in its manufacture, or in its processing into finished articles, can be shaped by flow (definition from ASTM D883-541).

The terms plastic and resin (q.v.) are used in overlapping senses but resin applies more specifically to the more or less chemically homogeneous polymers used as starting materials in the production of molded articles while plastic signifies the final solid product, which may contain fillers, plasticizers, stabilizers, pigments, etc.

The term alkyl refers to both straight chain and branched chain alkyl groups having from one through 20 carbon atoms. The term lower alkyl refers to both straight chain and branched chain alkyl groups having one through eight carbon atoms.

The term ferrocene refers to dicyclopentadienyl iron.

The term substituted or monosubstituted dicyclopentadienyl iron (or ferrocene), e.g. monoethyl dicyclopentadienyl iron or ethyl dicyclopentadienyl iron, refers to such compounds in which one of the cyclopentadienyl rings is so substituted. The term disubstituted dicyclopentadienyl iron (or ferrocene) refers to such compounds wherein both of the cyclopentadienyl rings are so monosubstituted.

A further understanding of the invention can be had from the following non-limiting examples.

EXAMPLE 1

A rigid polyurethane foam** based on diphenylmethane diisocyanate and α-methylglucoside polypropylene oxide polyether polyol is prepared having a density of 2.5 lbs. per cubic foot. A 10 × 10 × 10 mm. cube of the material is placed within a combustion chamber having a chimney and filter paper collector. The cube is then exposed to a flame for 30 seconds resulting in the complete combustion of the cube to give a char. This test is repeated three times, one time with a control sample containing no additive, once with a sample containing 0.4 parts, by wt., of ethyl ferrocene per 100 parts, by wt., of polyurethane and once with sample containing 0.8 parts, by wt., of ethyl ferrocene per 100 parts, by wt., of polyurethane. The results of this test are summarized in the following table.

| PARTS BY WT. OF MONOETHYL FERROCENE | % SMOKE* |
|---|---|
| none | 7.6 |
| 0.4 | 6.8 |
| 0.8 | 5.7 |

*% Smoke is determined by dividing the wt. of smoke collected on the filter paper by the amount of sample burned and multiplying by 100.

** POLYURETHANE FOAM

The foam is prepared by the "one-shot" technique, wherein the polyol portion of the reaction blend is formulated to contain fluorocarbon blowing agent, tin catalyst, amine catalyst in addition to the α-methyl glucoside propylene oxide polyol. 48 Parts, by wt., of this mixture is added to 52 parts, by wt., of diphenyl methane isocyanate and immediately subjected to high speed, high shear mixing for 10 seconds. The blended reaction mix is then transferred to an open top mold and allowed to foam and cure for 15 minutes. The sample cubes are then cut from the foam block with a band saw. The ethyl ferrocene containing samples are prepared in an identical manner with the ferrocene moiety being added to the polyol portion of the reaction blend prior to mixing with the isocyanate.

EXAMPLE 2

The procedures of Example 1 are repeated using dicyclopentadienyl iron, n-butyldicyclopentadienyl iron, 2,2-di(ethyldicyclopentadienyl iron)-propane, and the polymeric reaction product of ferrocene and methylal containing approximately 29 percent iron, respectively, in place of ethyl dicyclopentadienyl iron with similar reductions in smoke generation.

Obviously many modifications and variations of the invention, described herein above and below in the Claims, can be made without departing from the essence and scope thereof.

What is claimed is:

1. A polyurethane foam plastic, having improved smoke suppression properties, consisting essentially of a polyurethane foam plastic containing in chemically uncombined form about from 0.1 to 1%, by wt., based on the polyurethane polymer content of said plastic, of a dicyclopentadienyl iron compound selected from the group consisting of monoalkyl dicyclopentadienyl iron; dialkyl dicyclopentadienyl iron; mono alkanoyldicyclopentadienyl iron dialkanoyldicyclopentadienyl iron; ferrocene condensation dimers and polymers with aldehydes or ketones; vinyl ferrocene copolymers with vinyl chloride, acrylic acid, methyl methacrylate, butadiene, or cyclopentane; and mixtures thereof, and wherein as used herein above the terms alkyl and alkanoyl refer, respectively, to alkyl groups and alkanoyl groups having from one through 20 carbon atoms.

2. The composition of claim 1 wherein said polyurethane plastic is rigid polyurethane foam and contains about from 0.2 to 0.8%, by wt., based on the polyurethane polymer content of said plastic, of said dicyclopentadienyl iron compound.

3. The composition of claim 1 wherein said polyurethane plastic is flexible polyurethane foam and contains about from 0.2 to 0.8%, by wt., based on the polyurethane polymer content of said plastic, of said dicyclopentadienyl iron compound.

4. The composition of claim 1 wherein said dicyclopentadienyl iron compound is 2,2-poly(dicyclopentadienyl iron)-propane.

5. The composition of claim 1 wherein said dicyclopentyldienyl iron compound is selected from the group consisting of mono lower alkyl dicyclopentyldienyl iron; di (lower alkyl) dicyclopentyldienyl iron; mono lower alkanoyl dicyclopentyldienyl iron; di lower alkanoyl dicyclopentyldienyl iron and ferrocene condensation dimers and polymers with aldehydes or ketones and wherein the terms lower alkyl and lower alkanoyl refer, respectively, to alkyl groups and alkanoyl groups having from one through eight carbon atoms.

6. The composition of claim 5 wherein said polyurethane plastic is rigid polyurethane foam and contains about from 0.2 to 0.8%, by wt., based on the polyurethane polymer content of said plastic, of said dicyclopentadienyl iron compound.

7. The composition of claim 5 wherein said polyurethane plastic is flexible polyurethane foam and contains about from 0.2 to 0.8%, by wt., based on the polyurethane polymer content of said plastic, of said dicyclopentadienyl iron compound.

* * * * *